United States Patent [19]

Aalto et al.

[11] Patent Number: 5,268,574

[45] Date of Patent: Dec. 7, 1993

[54] TRANSFER DEVICE FOR CASSETTES CONTAINING RADIOACTIVE SAMPLES IN A GAMMA COUNTER AND CASSETTE SYSTEM

[75] Inventors: Juhani Aalto; Olli Hakala, both of Turku, Finland

[73] Assignee: Wallac Oy, Turku, Finland

[21] Appl. No.: 761,943

[22] PCT Filed: Mar. 21, 1990

[86] PCT No.: PCT/FI90/00071

§ 371 Date: Sep. 23, 1991

§ 102(e) Date: Sep. 23, 1991

[87] PCT Pub. No.: WO90/11536

PCT Pub. Date: Oct. 4, 1990

[30] Foreign Application Priority Data

Mar. 22, 1989 [FI] Finland ............... 891352

[51] Int. Cl.[5] ............ G01T 7/08; G01T 7/02
[52] U.S. Cl. ............................ 250/328
[58] Field of Search ............ 422/63, 65, 67, 71; 250/328, 364

[56] References Cited

U.S. PATENT DOCUMENTS 4,122,936 10/1978 Johnson ............ 250/328 X
4,454,939 6/1984 Kampf et al. ............ 250/328 X
4,924,093 5/1990 Johnson et al. ............ 250/328

FOREIGN PATENT DOCUMENTS 2307265 11/1976 France ............ 250/328

Primary Examiner—Constantine Hannaher
Assistant Examiner—Edward J. Glick
Attorney, Agent, or Firm—Shea & Gould

[57] ABSTRACT

A transfer device for cassettes containing radioactive samples and a cassette system in a gamma counter provided with a well-type detector. The transfer device comprises a path (61), by which cassettes (11, 12, 13) can be moved one at a time to a lifting position where sample containers can be lifted and moved to the measuring unit (50) for measuring. At the lifting position a vertical long side of the cassette (11, 12, 13) is locked in place against a vertical surface or edge (63) of the table (61) so that the distance between the center of the sample container (17) in the cassette from the vertical surface or edge of the table is substantially directly proportional to the radius of the sample container. The cassette system comprises at least two different cassettes (11, 12, 13) which are of the same length but which can take a different number of adjacently placed sample containers (17) of different sizes. The sample containers in each cassette are the same size. The width of the cassette is directly proportional to the width of the sample containers placed therein. The cassettes are also symmetrical about their longitudinal axis so that the center line of the sample containers is coincident with the center line of the cassette. The two long sides of each cassette are nearly similar and vertical.

2 Claims, 4 Drawing Sheets

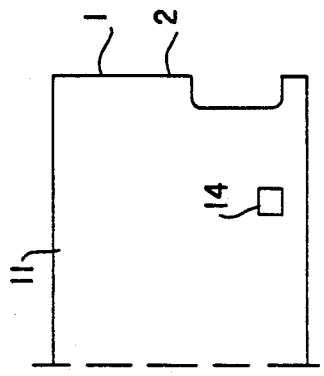
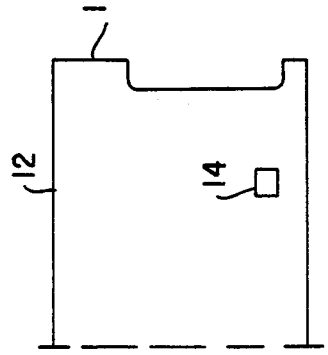
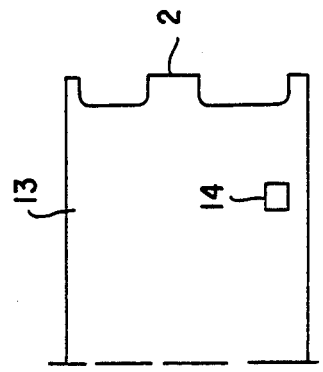
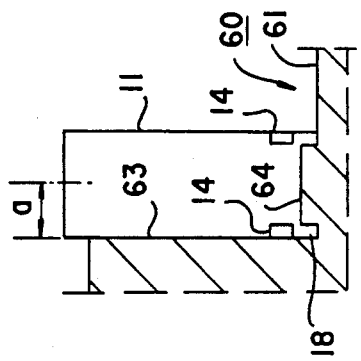
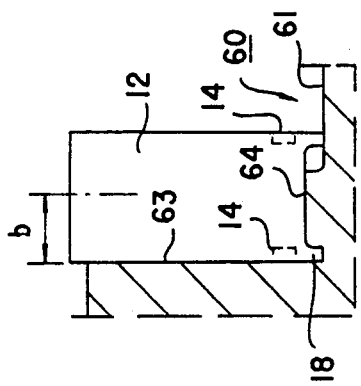
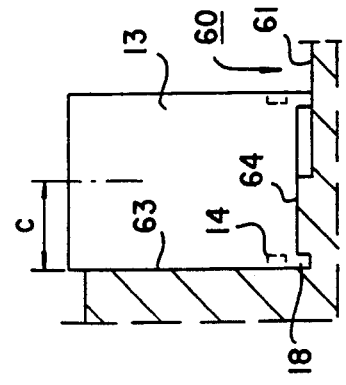

TRANSFER DEVICE FOR CASSETTES CONTAINING RADIOACTIVE SAMPLES IN A GAMMA COUNTER AND CASSETTE SYSTEM

BACKGROUND OF THE INVENTION

The invention relates to a transfer device for cassettes containing radioactive samples in a gamma counter provided with at least one well-type detector, the transfer device for the cassettes comprising a transfer unit or a path, which is a table provided with at least one conveyor, by which the cassettes of different widths, containing sample containers of different sizes, can be moved one at a time to a lifting position wherefrom the sample containers can be lifted into the measuring unit for measuring.

Gamma counter measurements of radioactive samples are commonly conducted using either RIA (Radio Immuno Assay) devices, then the question usually being of a mass survey, or research devices, the question being of a single research of a small series only. RIA devices must be fast and therefore they handle several samples simultaneously. A research device need not be so fast and samples may, instead, be in containers or cassettes of different sizes. The radioactive isotope of the samples may also emit high energy radiation and therefore the detector of a research device must be larger and the lead shield must be much better than in a RIA device.

Either well-type or diametrically through hole-type detectors are generally used in counters. Well-type detectors are provided with a hollow, formed in the detector material, in which the sample is inserted. In hole-type detectors a hole goes through the detector material into which the sample is lifted. A well-type detector is easier to manufacture. It also has better efficiency and it is easier to shield than a hole-type detector.

Known gamma counters have been disclosed, e.g., in the U.S. Pat. No. 4,029,961 and 4,035,642. In these devices the sample containers to be measured have been placed in cassettes of ten containers and the measuring device takes one cassette at a time for measuring. As there are ten gamma detectors in the device, all samples in the cassette can be measured simultaneously. However, this kind of device is only suitable for use in RIA measurements because it would become too large and expensive for use in research if manufactured using known technique. Moreover, one cannot use a well-type detector in this kind of device because the sample is lifted into the detector.

For economical reasons research devices have only one large and well-shielded detector. Since it has not been possible to combine RIA devices and research devices, those isotope laboratories which want to do both RIA counting and actual gamma research have been forced to purchase two separate counters. Therefore, for economical reasons, counters are also manufactured with 1, 2, or 4 detectors. They are larger and better shielded than necessary in actual RIA work and therefore they can, to a certain extent, be also used in research work. However, the drawback in RIA work is lower speed compared to actual RIA devices and limited efficiency in research work. Furthermore, the volume of samples cannot exceed that of RIA samples.

SUMMARY OF THE INVENTION

The object of this invention is to provide a new transfer device for cassettes, being of different sizes and containing radioactive samples. The invention is characterized in that, at the lifting position, one vertical long side of the cassette is locked in place against the edge of the table so that the distance of the center of the sample container in the cassette from the edge of the table is principally directly proportional to the radius of the sample container.

The object of the invention is also a cassette system for use in the transfer device presented above. The cassette system comprises at least two different cassettes, being of the same length but differing from each other principally in that cassettes can take a different number of adjacent sample containers depending on their size, the sample containers in the same cassette being of the same size with each other.

The invention is characterized in that the width of the cassette is principally directly proportional to the width of the sample containers to be placed therein, that the cassettes are principally symmetrical about their longitudinal axis so that the center line of the sample containers is principally coincident with the center line of the cassette, and that both the long sides of cassette are principally similar and vertical.

The other characteristics of the invention have been set forth in the ensuing claims.

BRIEF DESCRIPTION OF THE DRAWINGS

The invention will be described in the following by means of examples with reference to the accompanying drawings in which

FIG. 6 shows the sample cassette, viewed from the end, at a position where the samples are being lifted into the measuring unit.

FIG. 7 shows the end of the sample cassette of FIG. 6 viewed from the side.

FIG. 8 corresponds to FIG. 6 and shows another embodiment of the sample cassette.

FIG. 9 shows the end part of the sample cassette of FIG. 8 viewed from the side.

FIG. 10 corresponds to FIG. 6 and shows a third embodiment of the sample cassette.

FIG. 11 shows the end of the sample cassette of FIG. 10 viewed from the side.

DESCRIPTION OF PREFERRED EMBODIMENTS

Figure 1:
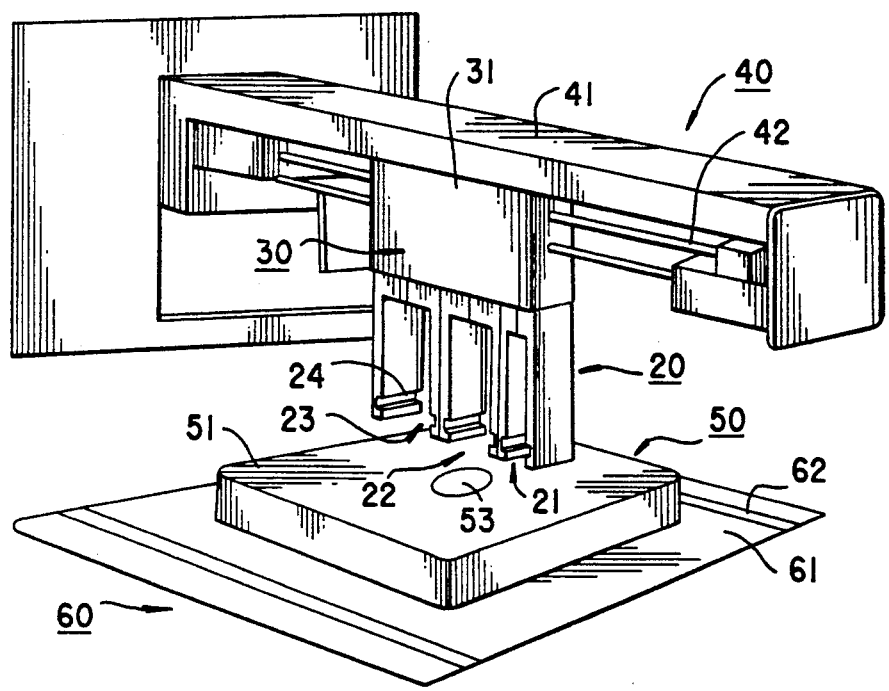
FIG. 1 shows an axonometric view of a gamma counter according to the invention.

FIG. 1 shows an axonometric view of a gamma counter according to the invention, the principal functional parts being a measuring unit 50 and a lifting device 40 consisting of a transfer device unit 30 and a grip unit 20, belonging thereto, for the sample container holders. The transfer device unit 30 is mounted on a cantilever beam 41 which can be moved in vertical direction in order to lift a sample container holder out of the sample container cassette and to lower it into the measuring unit 50.

The grip unit consists of a slide 31 moving on a horizontal guide bar 42, the slide having three pairs of grip nails 24 attached thereto. These form the three grip elements 21, 22, and 23, being of different sizes, for gripping the holders, being of different widths, of sample containers.

The measuring chamber of the measuring unit 50 is provided with only a single big hole 53 for the detector. The gamma counter in FIG. 1 is, therefore, meant for use in research and it can take sample containers of different sizes in cassettes of different sizes one at a time for analysis.

Operation of the device of FIG. 1 is described in greater detail in the following figures.

Figure 2:
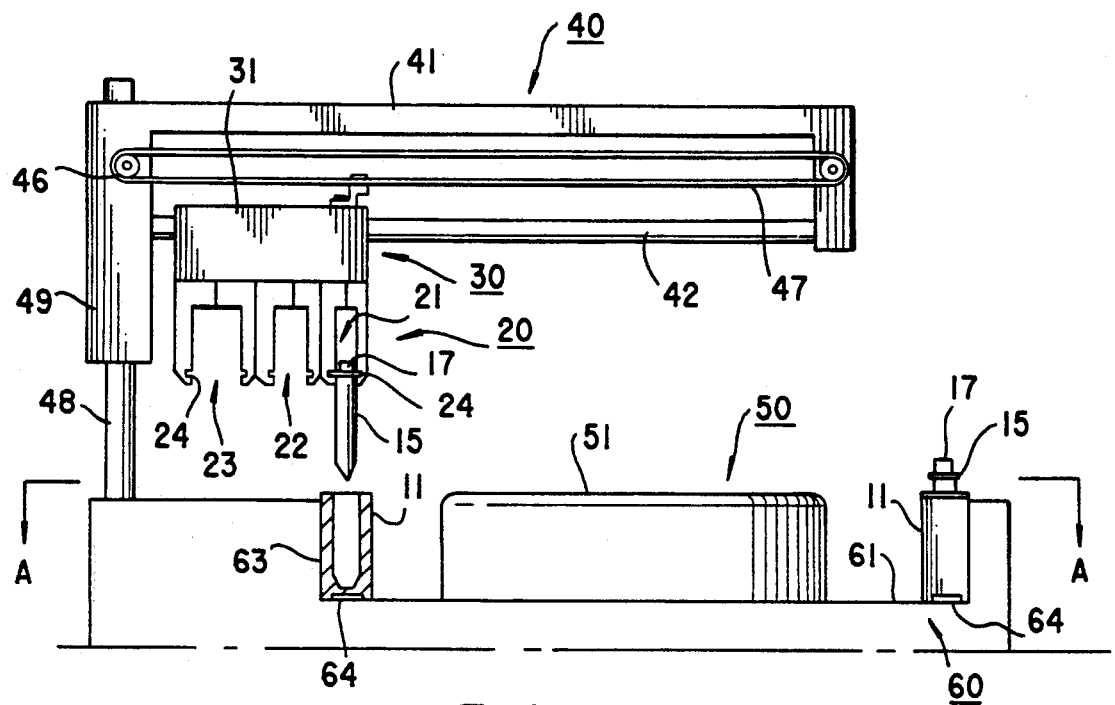
FIG. 2 shows the gamma counter of FIG. 1 viewed from the side.
Figure 3:
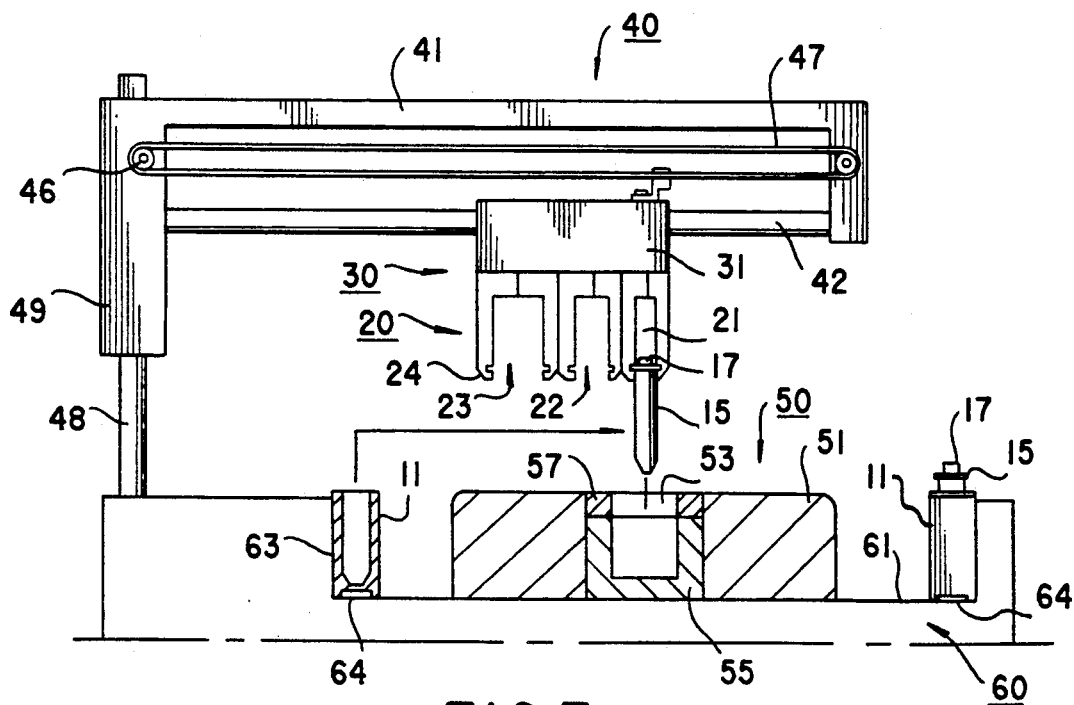
FIG. 3 corresponds to FIG. 2 and shows the gamma counter moving a sample container into the measuring unit.

FIG. 2 shows the main parts of the gamma counter of FIG. 1 viewed from the side. Sample container cassettes 11, which contain sample container holders 15 and, inside them, sample containers 17, are placed in the cassette transfer unit 60 on the measuring table 61, being in connection with a conveyor 62 which moves one cassette at a time to a position for lifting the sample containers. In FIG. 3 its location is in the left corner of the measuring table 61, the cassette 11 being shown as a cross-sectional view. In this gamma counter one can use sample containers and their cassettes of three different sizes because the grip unit 20 has three grip elements 21, 22, and 23 of different sizes.

The lifting device 40 accomplishes the transfer of samples to the measuring unit 50 for measuring. The transfer unit 30 is moved on a horizontal guide bar 42 of the cantilever beam 41 by means of a cogged belt 47 and an electric motor 46. Based on information obtained from a cassette identifier, located on the cassette path before the measuring point, the slide 31 in the transfer unit 30 moves so that a grip element of the right size is right above the cassette. It can be seen in the figure that the smallest of the grip elements 21, 22, and 23 has been selected i.e. the one with the reference number 21. The grip nails 24 will subsequently lift the sample container holder 15 out of the cassette 11. The vertical movement has been arranged so that the whole cantilever beam 41 rises with a block 49 slidably mounted on the guide bars 48.

FIG. 3 illustrates a situation where the transfer unit 30 of the gamma counter has moved the holder 15 of the sample container in a horizontal direction right above the measuring hole 53 of the measuring unit 50. After this the cantilever beam 41 on the whole is lowered, the sample container going down into the measuring hollow 53 having a well-type detector 55. The measuring unit 50 has such a construction that the measuring chamber 51, being made of lead, is provided with a hollow of the same size as the detector 55.

The detector has been installed by lowering it downward from above into its hollow and mounting a protective ring 57 on top. The advantage of the construction is that, whenever necessary, one can easily change the detector from above.

Figure 4:
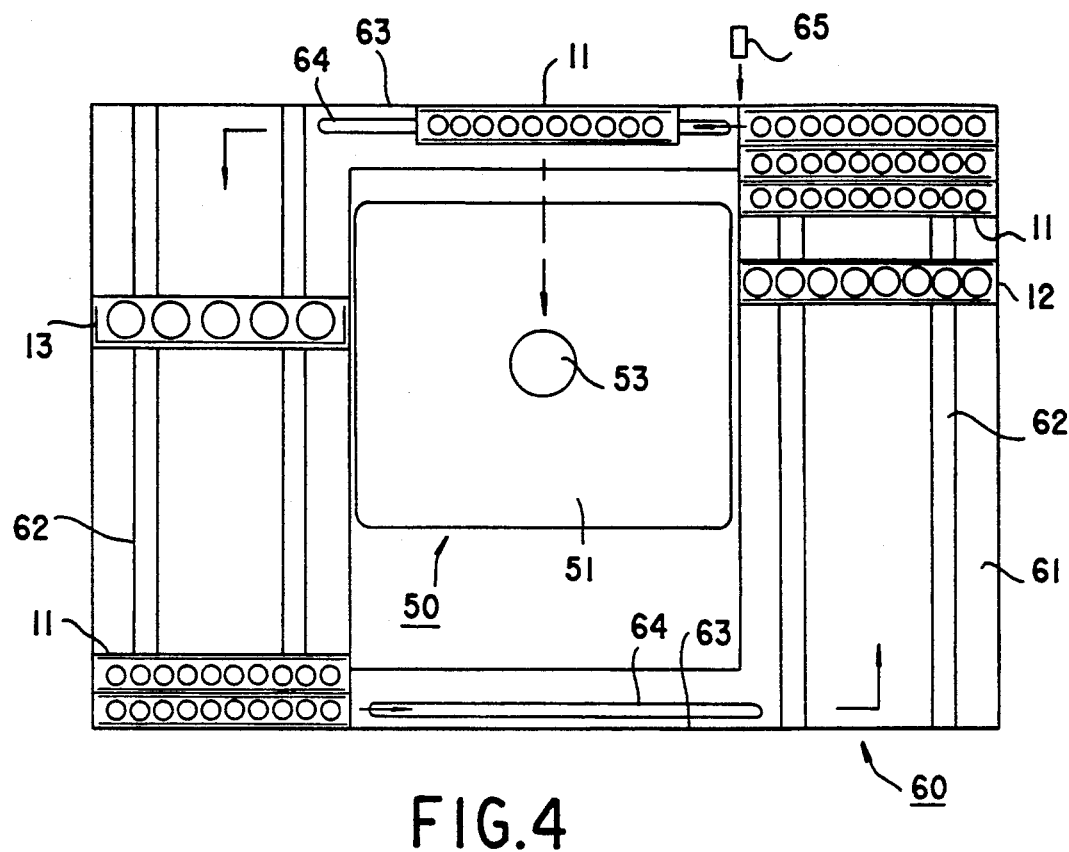
FIG. 4 shows a sectional view taken along the line A—A in FIG. 2.

FIG. 4 shows the gamma counter of FIG. 1 viewed from above. In the figure the measuring table 61, having the measuring unit 50 in the middle, forms the cassette transfer unit 60. The measuring unit has a measuring chamber 51 containing one detector. Sample container cassettes 11, 12, and 13 of different widths are placed on the table 61 where they are transferred in turn for measuring by means of conveyors 62. The cassettes rotate along a path round the measuring unit 50. A transducer 65 for identifying cassettes has been placed on the path, before the measuring point, the transducer identifying the width of the cassette and the size of the sample containers therein and controlling that a suitably sized grip element is transferred above the sample. This device is suitable for research work where simultaneous measurement of many samples is generally not required, but the detector is large enough and the walls of the measuring chamber are thick enough.

Figure 5:
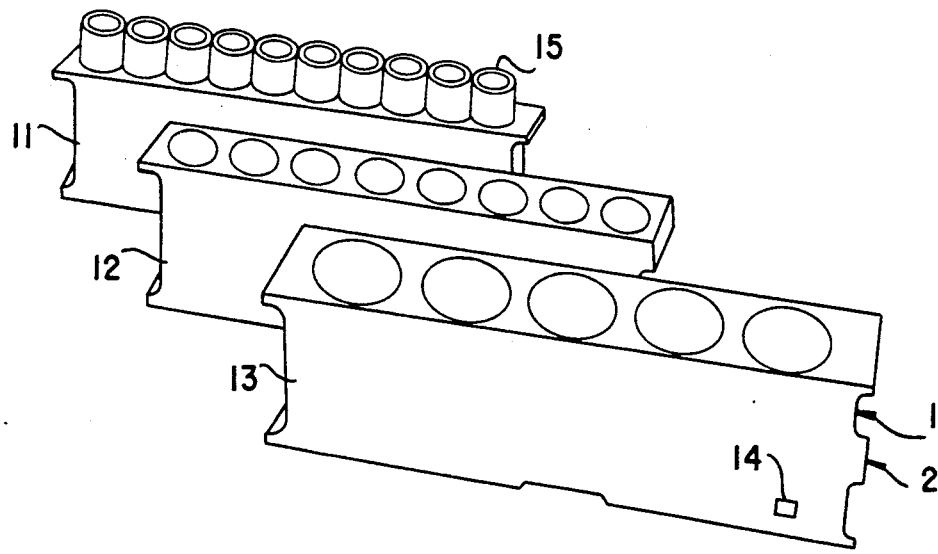
FIG. 5 shows sample container cassettes, being movable on the transfer table, of the gamma counter of FIG. 4.

FIG. 5 shows three sample container cassettes 11, 12, and 13 of different sizes. Their lengths are the same but the widths are different. The width of the cassette defines the size of sample containers it can take. The narrowest cassette 11 can take ten small sample containers along with their holders. The cassette is then provided with the corresponding number of recesses for the sample containers. A medium wide cassette takes eight medium-sized sample containers and the widest cassette takes five wide sample containers. The gamma counter shown in FIG. 1 can measure all sample container sizes mentioned above. To identify cassettes of different sizes the end parts of all cassettes have been provided with identification parts 1 and 2. The transducer, placed in connection with the transfer unit, identifies the width of the cassette by the form of the identification part.

The sample container cassette 11 is schematically shown in FIG. 6 on the measuring table 61 of the transfer unit 60 at a position where the samples are lifted up. It is seen in the figure that there is a guide 64, raising from the surface of the table, formed along the path on the table. A corresponding recess has been formed on the cassette 11 so that, on the lower edge of the cassette, a guide edge 18 is formed, the width corresponding to the distance between the guide 64 on the table and the edge 63 of the table. When the guide edge 18 of the cassette moves in the groove between the guide and the table edge, the cassette stays sideways firmly in place with its other side leaning against the edge 63 of the measuring table. The forward transfer movement of the cassette is performed so that the nail of the pulling device inside the table edge 63 grips the opening 14 on the side wall of the cassette. At the same time, this nail of the pulling device in the opening of the cassette prevents the cassette from rising, the cassette being held firmly on the path 61 also in the vertical direction.

FIG. 7 shows as a side view that end of the cassette which comes first to the place where the samples are to be lifted. As shown in the figure, the cassette is provided with two identification parts 1 and 2 by means of which the transducer 65 shown in FIG. 4 identifies the width of the cassette. In this cassette both parts are closed and so the transducer, identifies the cassette to be a thin type. FIG. 7 also shows the hole 14 for the nail of the pulling device locating on the side of the cassette.

FIG. 8 shows a medium wide cassette 12. It is shown in the figure that the guide 64 on table 61 and the nail of the pulling device lock also this cassette firmly in place on the path. This is due to the fact that the guiding edge 18, in the lower edge of the cassette, is quite similar to that of a thin cassette, apart from the fact, that the recess under the cassette is wider which is due to the greater width of the cassette. So, one can reliably move cassettes of different widths on the transfer path as long as the width of the guiding edge 18 in their lower edge corresponds to the distance of the guide 64 of the table and the edge 63 of the table from each other.

FIG. 9 shows also that a medium wide cassette 12 has been marked for the identification transducer in such a way that only the upper identification part 1 is closed.

FIG. 10 shows a wide cassette 13 whose control is performed exactly in the same way as that of the other cassettes. Only the identification parts are different, as seen in FIG. 11. In this case only the lower identification part 2 is closed.

It can be seen in FIGS. 6, 8 and 10 that the other side of the cassettes 11, 12, and 13 leans against the same edge 63 of the measuring table 61 so that the middle part of a wider sample cassette remains farther away from the edge than that of a narrow cassette. This distance of the middle part from the edge 63 is marked with letters a, b, and c in the figures.

Since the distance of the middle part of the cassette, i.e., a,b, and c varies, the cassette transfer unit in a gamma counter of FIGS. 1 and 2 has been designed to operate so that the slide on the horizontal guide bar is controlled by the information obtained from the identification transducer. Firstly, the right grip element is chosen out of the grip units 21, 22, and 23 shown in FIG. 2. After that, the middle part of the chosen grip element is moved to a distance a, b, or c from the edge 63. Now, the cassette can be moved so that the holder of the sample container moves between the nails 24 of the grip element 21 and the lifting of the sample can start thereafter.

It is obvious to a specialist that the different embodiments of the invention can vary within the scope of the ensuing claims.

We claim:

1. A transfer device for transferring cassettes of different widths which contain radioactive sample containers of different sizes in a gamma counter, comprising:

a plurality of cassettes of different widths which contain sample containers of correspondingly different sizes, a measuring unit having at least one well-type detector, a transfer unit having at least one conveyor for moving one of said cassettes of different widths to a lifting position where a sample container is lifted from said one cassette and moved for insertion into said well-type detector, means forming a vertical surface adjacent said lifting position, and means on and adapted to cooperate between each of said cassettes of different widths and said transfer unit for locking a vertical long surface of said cassette against said vertical surface, whereby the distance between said vertical surface and the center of each sample container in a cassette to be locked against said vertical surface is substantially directly proportional to the radius of the sample containers contained in said cassette to be locked against said vertical surface.

2. A transfer device for transferring cassettes containing radioactive containing sample containers of different sizes in a gamma counter of the type including a measuring unit having at least one well-type detector, a transfer unit having at least one conveyor for moving a cassette to a lifting position where a sample container is lifted from said cassette and moved for insertion into said well-type detector, wherein the improvement comprises:

means forming a vertical surface adjacent said sample container lifting position, and a cassette system comprising a plurality of cassettes having two vertical sides of substantially the same length with each cassette adapted to receive a number of adjacently placed sample containers of the same size and at least one of said cassettes having a width different from the width of other ones of said cassettes so as to receive a number of sample containers having a width different from the width of sample containers in said other ones of said cassettes, said width of each of said cassettes being substantially directly proportional to the width of the sample containers in each respective cassette, each of said cassette being substantially symmetrical about a longitudinal center line with a center line of the sample containers received therein substantially coincident with the longitudinal center line of each cassette, and means on and cooperating between each cassette and said transfer unit for locking one of said vertical sides of each cassette against said vertical surface adjacent said sample container lifting position.

* * * * *